CIRCUIT FOR AUTOMATIC ADJUSTMENT OF IMPEDANCE OF A TELEPHONE LOOP

Filed Feb. 26, 1962

INVENTOR
WILLEM D. MEEWEZEN
BY Frank R. Trifari
AGENT 3,251,951

CIRCUIT FOR AUTOMATIC ADJUSTMENT OF IMPEDANCE OF A TELEPHONE LOOP

Willem Douwe Meewezen, Woodville, South Australia, Australia, assignor to North American Philips Company, Inc., New York, N.Y., a corporation of Delaware Filed Feb. 26, 1962, Ser. No. 175,449
2 Claims. (Cl. 179—81)

Under certain conditions telephone sets, for example, are used with their own battery. It may occur that such a set is connected via a short line to a private exchange, connected to the public mains and through a much longer line to a public exchange. In this case and in other cases, for example with remote-measuring, and remote-control systems with line transmission it is desirable to have a simple device, preferably a two-terminal device available, so that variations of the direct-current resistance and/or the impedance of the loop employed can be automatically compensated. In a telephone system it can thus be ensured that the effectiveness of the microphone remains substantially constant regardless of the length of the line through which the excitation direct-current for this microphone is supplied and through which the variations of this direct current produced by the microphone are transmitted. Such a compensation is particularly required with telephone sets having a low internal impedance.

The present invention relates to a two-terminal device for insertion into a direct-current loop, such as a telephone line, for compensating variations in the resistance of this loop.

The two-terminal device according to the invention is characterized in that it includes the series connection of a diode and a resistor of high value with respect to the maximum direct-current resistance of the loop, and a transistor. The base of the transistor is connected to the common point of the resistor and of the diode. The emitter is connected to one first terminal of the device and to the diode. The collector is connected to the second terminal of the device and to the resistor. The device is connected so that the emitter of the transistor is biassed in the forward direction by the direct current circulating through said loop.

The invention will now be described more fully with reference to the drawing, in which FIG. 1 shows the circuit diagram of a first embodiment of the two-terminal device according to the invention;

Figure 1:
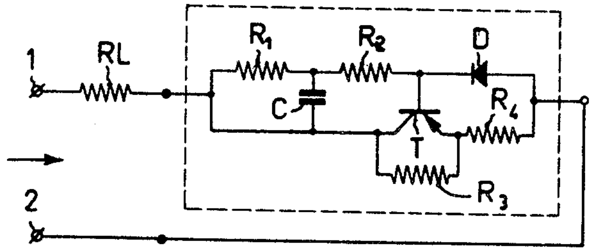

The embodiment shown in FIG. 1 comprises the series combination of a resistor $R_1$, a resistor $R_2$ and a diode D, for example of the type OA200. The diode is connected in the forward direction with respect to the direct current passing through the loop. The emitter-collector electrode path of a pnp-transistor T, for example of the type OC80, shunted by a parallel resistor $R_3$, the whole in series with an emitter resistor $R_4$, is connected to the terminals of the line or loop having an internal resistance $R_L$, in parallel with the series combination of the first-mentioned resistors $R_1$, $R_2$ and of the diode D. The base of the transistor T is connected to the common point of the resistor $R_2$ and of the diode, so that the emitter of the transistor T is biassed in the forward direction by the voltage drop across the diode D. The resistor $R_1$ is shunted by a capacitor C, which reduces the impedance of the two-terminal device for alternating voltages.

The series resistance of resistor $R_1$ and $R_2$ is high with respect to the forward resistance of the diode D so that the direct current passing through this diode is practically independent of the current-voltage characteristic of the diode, whereas the voltage across the diode is determined by this characteristic. The relation between the voltage across the diode D and the current through the resistors $R_1$ and $R_2$ has therefore substantially a logarithmic shape.

If the value of the resistor $R_4$ is small, for example 10 ohms, the current passing through the collector-emitter path of the transistor T will also be a logarithmic function of the voltage across the two-terminal device. The parallel resistor $R_3$ serves to reduce the power dissipated in the transistor T so that a cheaper transistor can be employed. A large part of the current through the loop or line passes through this resistor. Resistor $R_3$ can be omitted when a transistor T of higher dissipation power is used.

In a two-terminal device according to the invention, the sum of the current through the resistor $R_3$ and of the current through the transistor T varies in accordance with the voltage drop across the diode D as long as the transistor is conducting.

The resistor $R_4$ is preferably an element, the resistance value of which increases with the passing current. For example, $R_4$ may be an incandescent lamp of 6.3 v. and 150 ma., the resistance of which is equal to 7.5 ohms in the cold state with a current of 30 ma. and to 12 ohms with a current of 60 ma.

The two-terminal device described above is capable of compensating for the major part the variations of the direct current passing through a telephone set owing to variations in the length, and hence of the resistance, of the line to which this set is connected.

With the aid of the capacitor C a two-terminal device with a desired alternating-current impedance lower than its direct-current resistance can be obtained. The capacitor increases the alternating current through the diode D and therefore reduces the alternating-current impedance of the two-terminal device. It is therefore possible to vary the ratio between the effect of the two-terminal device for direct current and its effect with respect to alternating currents by varying the ratio between the resistors $R_1$ and $R_2$. If the resistor $R_4$ is an incandescent lamp, the resistance thereof is practically not affected by the alternating currents, due to the thermal inertia of this lamp.

The two-terminal device described above may be connected in series with the line through which a telephone set is connected or, if the telephone set is connected to the line via a rectifying bridge, it may be connected between a direct current output terminal of this bridge and the corresponding terminal of the telephone set. With respect to a switch short-circuiting the telephone set during dialling, the two-terminal device is preferably connected so that it remains included in the dialling loop during the dialling operation, in order to reduce the distortion of the dialling pulses.

Figure 3:
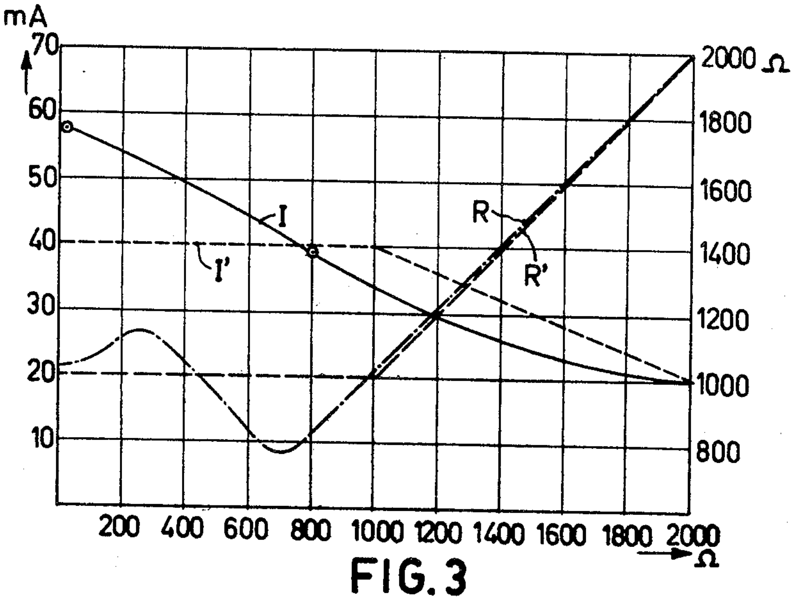
FIG. 3 shows a graph for explaining the operation of these embodiments.

In FIG. 3, the solid line curve I illustrates the current through the device of FIG. 1, and through the line, as a function of variable resistance $R_2$ of the line. The dot-dash curve R illustrates the A.C. impedance of the combined line and device as a function of the resistance $R_2$ of the line. The dashed curves I′ and R′ illustrate ideal shapes for the curves I and R, respectively. The elements of the two-terminal device had the following values:

| | |
|---|---|
| $R_1=R_2$ | 4700 ohms. |
| $R_3$ | 600 ohms. |
| $R_4$ cold filament of an incandescent lamp of 6.3 v. | 150 ma. |
| C | 0.15/$\mu$f. |
| D diode | OA200. |
| T transistor | OC80. |
| Line direct current voltage | 50 v. |

The following examples show the improvement obtained by using the two-terminal device shown in FIG. 1 with respect to telephone sets of 100 ohms and to telephone sets of 600 ohms and with the lines indicated.

(a) Two telephone sets of 600 ohms were interconnected by a short loop, corresponding to the case of telephone sets with their own batteries connected through a private exchange connected to the public mains. The microphone direct current was then 100 ma. and the total A.C. loop impedance was 1200 ohms.

(b) Two telephone sets of 600 ohms were interconnected through two loops of 800 ohms, corresponding to a case in which the telephone sets are connected through a public exchange. The microphone direct current was then 40 ma. and the overall alternating current impedance was 2600 ohms.

The difference between the respective effectivenesses of these two cases as regards the microphones is 13 db, i.e. 6 db owing to the reduced microphone direct current and 7 db owing to the higher damping of the line.

(c) Two telephone sets of 100 ohms were interconnected through a short loop, for example a private exchange connected to the public mains, with two-terminal device of the kind shown in FIG. 1; the microphone direct current was 57 ma. and the overall A.C. impedance was 2260 ohms.

(d) Two telephone sets of 100 ohms with two-terminal device as shown in FIG. 1 were interconnected through two loops of 800 ohms; the microphone direct current was 39 ma. and the overall A.C. impedance was 1880 ohms.

The difference between the respective effectivenesses in these two cases as regards the microphones is 1 db: a loss of microphone output power of 3 db owing to the lower microphone direct current and a gain of 2 db owing to the reduced A.C. loop impedance.

When telephone sets with two-terminal devices as shown in FIG. 1 and with the values indicated for the various elements thereof are used in connection with higher loop resistances, the alternating current impedance will, of course, increase and the direct current will decrease. However, the values of the elements of the two-terminal device can be varied and adapted to any particular condition. By choosing a higher value of the resistor $R_4$, for example, the line direct current is reduced in the case of a short line, and a direct current of 20 ma. is nevertheless maintained through loops of 2000 ohms, whereas the alternating current impedance can be adjusted to the desired value by varying the ratio between $R_1$ and $R_2$.

Figure 2:
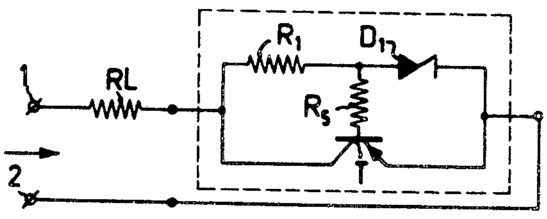
FIG. 2 shows the diagram of a second embodiment.

FIG. 2 shows finally the circuit diagram of a second embodiment of the two-terminal device according to the invention. The differences with respect to the embodiment of FIG. 1 are: the resistors $R_2$, $R_3$ and $R_4$ and the capacitor C are omitted; the diode D is replaced by a diode $D_1$, operating as a Zener diode, driven in the reverse direction, and the base of the transistor T is connected to the common point of the diode $D_1$ and of the resistor $R_1$ through a resistor $R_5$.

The value of the resistor $R_1$ is chosen so high that, under practically all operational conditions, the larger part of the direct current through the two-terminal device is formed by the collector current of the transistor T. This current is practically constant as long as the transistor does not operate beneath the bend of its collector current-voltage characteristic curve, which would only occur with very high values of the loop resistance $R_L$. In fact, this collector current is determined by the substantially constant voltage across the diode $D_1$ and by the value of the resistor $R_5$.

With the aid of this second embodiment an approximation of the curves indicated in FIG. 3 in broken lines, which are ideal as regards the direct current, can be obtained. However, no partial compensation of the damping of the line by a reduction of the overall alternating-current impedance can be obtained by this means.

What is claimed is:

1. A two-terminal current regulating device for insertion in series in a direct loop between a current source and a variable resistance load circuit, whereby variation of current in said loop circuit with variation in resistance of said load circuit is reduced, said device having first and second terminals, said two-terminal device comprising a transistor having emitter, base and collector electrodes, means connecting said collector electrode to said second terminal, first resistor means connected between said emitter electrode and said first terminal, said first resistor being a non-linear resistor having a positive temperature coefficient, a series circuit of diode means and second resistor means connected in that order between said first and second terminals, said diode means being connected in the forward direction with respect to the direct current of said loop, and means connecting said base electrode to the junction of said second resistor and diode means, the resistance of said second resistor means being greater than the forward resistance of said diode means and the maximum resistance of said loop.

2. A two-treminal current regulating device for insertion in series in a direct current loop between a current source and a variable resistance load circuit, whereby variation of current in said loop circuit with variation in resistance of said load circuit is reduced, said device having first and second terminals, said two-terminal device comprising a transistor having emitter, base and collector electrodes, means connecting said collecter electrode to said second terminal, first resistor means connected between said emitter electrode and said first terminal, a series circuit of diode means and second resistor means connected in that order between said first and second termianls, said diode means being connected in the forward direction with respect to the direct current of said loop, said second resistor means comprising a pair of serially connected resistors, capacitor means connected between the junction of said serially connected resistors and said second terminal, whereby the alternating current impedance of said device is reduced, and means connecting said base electrode to the junction of said second resistor and diode means, the resistance of said second resistor means being greater than the forward resistance of said diode means and the maximum resistance of said loop.

References Cited by the Examiner

UNITED STATES PATENTS

| | | | |
|---|---|---|---|
| 2,716,729 | 8/1955 | Shockley | 323—22 |
| 2,751,550 | 6/1956 | Chase | 307—88.5 |
| 2,818,470 | 12/1957 | Busala | 179—81 |
| 2,991,405 | 7/1961 | Carlson | 307—88.5 |
| 2,993,092 | 7/1961 | Herbig et al. | 179—18 |
| 3,007,102 | 10/1961 | Kennedy | 321—16 |
| 3,035,122 | 5/1962 | Livingston | 179—18 |
| 3,114,872 | 12/1963 | Allard | 307—88.5 |
| 3,177,295 | 4/1965 | Lane et al. | 179—81 |

OTHER REFERENCES

Journal of the I.E.E., "Sensitivity Control for New Telephone Set," vol. 5, No. 54, June 1959, pp. 381–383.

ROBERT H. ROSE, *Primary Examiner.*

WALTER L. LYNDE, *Examiner.*